BEST AVAILABLE COPY

Aug. 29, 1950 L. E. MARCHANT ET AL Re. 23,263

THREE-DIMENSIONAL COPYING MACHINE

Original Filed Sept. 9, 1948 4 Sheets-Sheet 1

Inventors
L. E. Marchant
V. W. Hall
J. O. Creek
by Robert G. Mayfield
ATTY.

THREE-DIMENSIONAL COPYING MACHINE

Original Filed Sept. 9, 1948 4 Sheets-Sheet 2

Inventors
L. E. Marchant
V. W. Hall
J. O. Creek
By Merrill E. Mayfield
Atty.

THREE-DIMENSIONAL COPYING MACHINE

Original Filed Sept. 9, 1948 4 Sheets-Sheet 3

Inventors
L. E. Marchant
V. W. Hall
J. O. Greek
by
Atty.

THREE-DIMENSIONAL COPYING MACHINE

Original Filed Sept. 9, 1948 4 Sheets-Sheet 4

Inventors
L. E. Marchant
V. W. Hall
J. O. Creek
by Brett G. Mayhew
ATTY.

Reissued Aug. 29, 1950

Re. 23,263

UNITED STATES PATENT OFFICE 23,263

THREE-DIMENSIONAL COPYING MACHINE

Lawrence Edgar Marchant, Toronto, Ontario, Victor Wilson Hall, Malton, Ontario, and John Oliver Creek, Brampton, Ontario, Canada, assignors, by mesne assignments, to Canadian Patents and Developments Limited, Ottawa, Ontario, Canada Original No. 2,488,088, dated November 15, 1949, Serial No. 48,454, September 9, 1948. Application for reissue June 15, 1950, Serial No. 168,322

19 Claims. (Cl. 51—100)

Matter enclosed in heavy brackets [ ] appears in the original patent but forms no part of this reissue specification; matter printed in italics indicates the additions made by reissue

This invention relates to machine tools for the reproduction of three dimensional surfaces, to any desired scale, by cutting tools such as tool bits, grinding wheels and the like.

The principal object of the invention is to provide an automatic copying machine which will reproduce with a high accuracy the contours of a pattern, which, in order to minimize errors, is constructed to a larger scale than the article to be manufactured.

An additional object is to provide a copying machine which will reproduce an enlarged copy of a pattern in those instances where a proportional increase in the errors is of minor importance.

A further object of the invention is to eliminate as much hand work as possible in the manufacture of accurate and highly finished articles such as forging dies, one-to-one reproduction masters, and the like and to provide a mechanical and automatic means of producing a finely ground finish on surfaces of complex curvature.

All of the foregoing and still further objects and advantages of the invention will become apparent from a study of the following specification, taken in conjunction with the accompanying drawings, wherein like characters of reference indicate corresponding parts throughout the several views and wherein.

Figure 5:
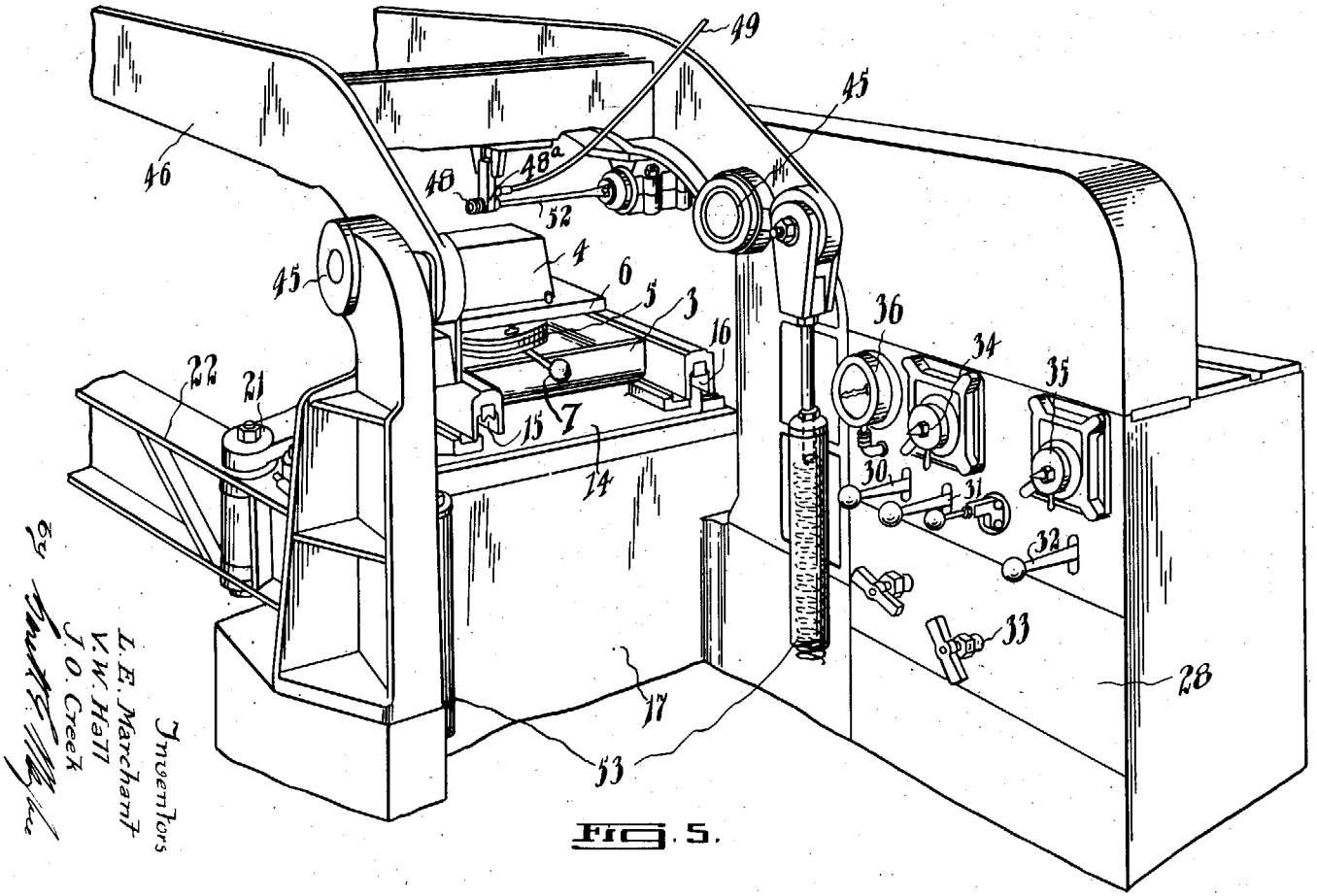
Fig. 5 is a perspective view of the work table and of the machine, also showing the control box.

The horizontal table 1, on which a pattern 2 may be supported and securely attached, hereinafter will be referred to as the pattern table 1, and the horizontal table 3 upon which, as particularly shown in Fig. 5, the work piece 4 may be supported and securely attached, hereinafter will be described as the work table 3. The work table 3 houses a vertical column 5 on which is mounted a rotatable horizontal platform 6. The work piece 4 may be attached to the platform 6, and the platform may be raised or lowered relative to the work table by hydraulic means incorporated in the column 5, or may be rotated through 360° horizontally. Locking against rotation is effected by a handle, not illustrated in the drawings, located closely underneath the platform 6, and locking in a vertical sense is effected by a handle 7.

Figure 4:
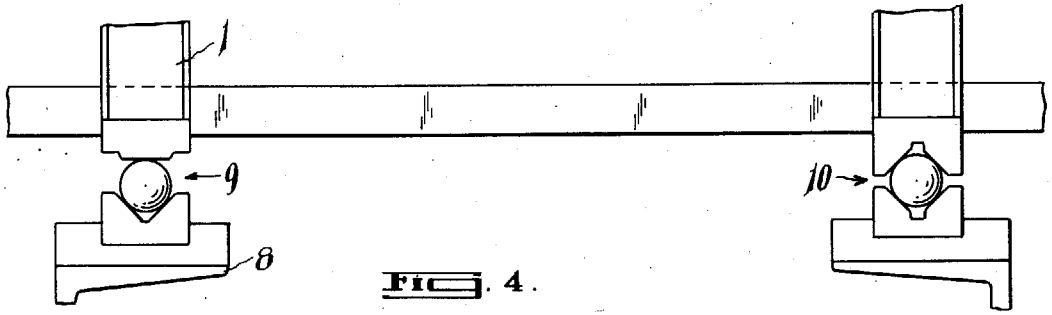
Fig. 4 is a diagrammatic representation of the linear bearings supporting the pattern table.
Figure 3:
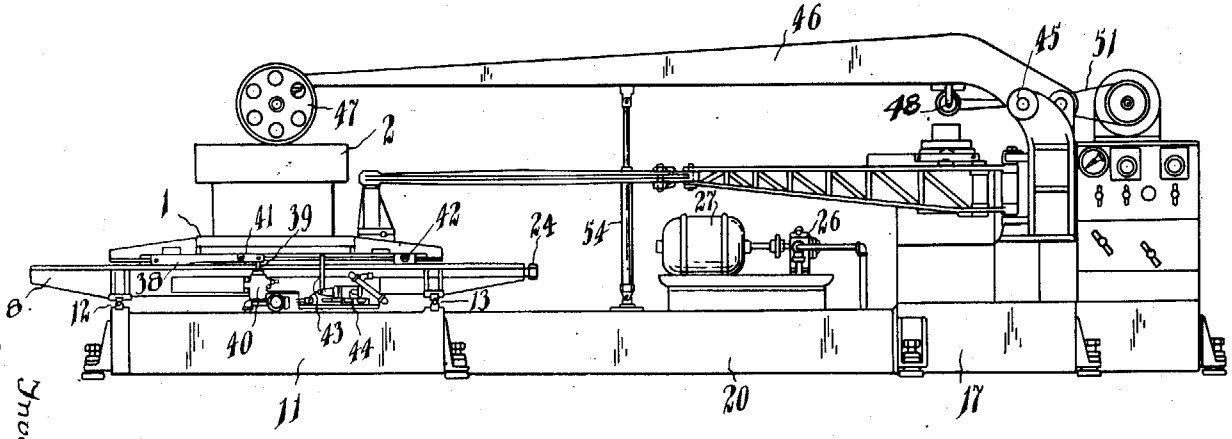
Fig. 3 is a side elevation of the machine.

The pattern table 1 is mounted on a carriage 8 through the medium of a pair of linear ball bearings 9 and 10, which are substantially parallel to one another. The races or tracks of these bearings are of V section, with the exception of the upper race of bearing 9 which is flat to accommodate any slight errors in parallelism or spacing between the bearings; this is particularly illustrated in Fig. 4. The carriage 8 is in turn mounted on a fixed base 11 forming part of the fame, through the medium of a pair of linear ball bearings 12 and 13, these bearings being in a horizontal plane parallel to the plane in which bearings 9 and 10 lie, and running transversely of the said bearings. The races or tracks of bearings 12 and 13 are of V section, with the exception of the upper race of bearing 12 which is flat to accommodate any slight errors in parallelism or spacing between the bearings. Thus the linear bearings of the carriage are similar to those of the pattern table illustrated in Fig. 4.

The work table 3 is similarly mounted on a carriage 14 through the medium of a pair of linear ball bearings 15 and 16 which lie parallel to the bearings 9 and 10 of the pattern table 1. The races or tracks of these bearings are of V section, with the exception of the upper race of bearing 16 which is flat; these bearings are also similar to those illustrated in Fig. 4. The carriage 14 is in turn mounted on a fixed base 17 forming part of the frame, through the medium of a pair of linear ball bearings 18 and 19, these bearings being in a horizontal plane parallel to the plane of the bearings 15 and 16 and running transversely thereof. Again the races or tracks of bearings 18 and 19 are of V section with the exception of the upper race of bearing 18 which is flat; these bearings are also similar to those illustrated in Fig. 4.

The bases 11 and 17 are two separate units adjustably connected together by a distance member 20 to facilitate the accurate alignment and levelling of the bearings so that the pattern table 1 and the work table 3 are free to move in parallel horizontal planes in any direction and with a minimum of friction. The bases 11 and 17 together with the distance member 20 joining them provide the frame of the machine.

To the base 17 are pivotally anchored at 21, 21 a dual set of pantograph arms 22 operating in a horizontal plane and linking the pattern table 1 to the work table 3. Thus any movement of the pattern table is transferred through the pantograph arms to cause a movement of the work table, such movement of the work table being in the same sense as the movement of the pattern table, but of reduced amplitude according to the ratio prescribed by the pantograph. In the machine shown in the drawings the ratio of the movement of the pattern table with respect to the movement of the work table is ten to one.

The arms of the pantograph mechanism are of rigid construction and have ball and taper roller bearings at their respective joints to reduce friction. Futhermore, the connection of the work table 3 to the pantograph arms at 23, 23 allows for freedom of vertical movement of the table, so that no vertical load is transmitted to the pantograph mechanism and the weight of the work table is carried solely by the bearings 15, 16, 18 and 19 at all times.

Figure 1:
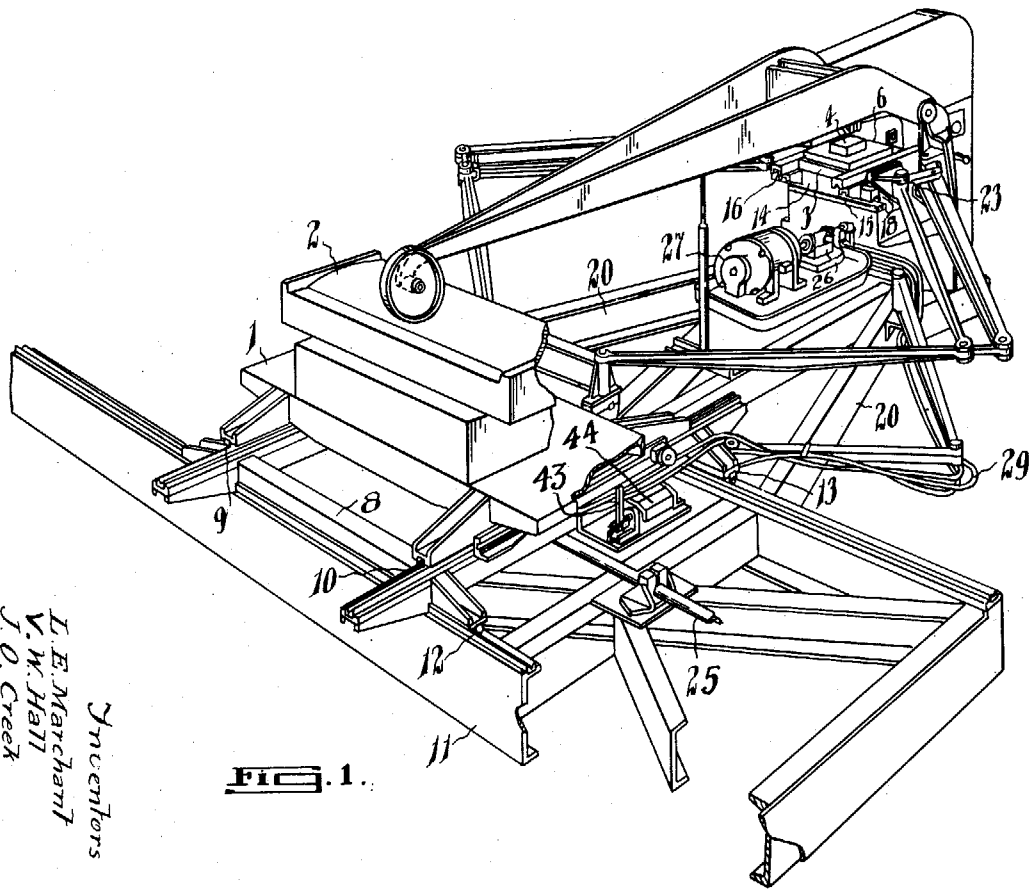
Fig. 1 is a general view of the machine in perspective, some parts being shown broken away for the sake of greater clarity.
Figure 2:
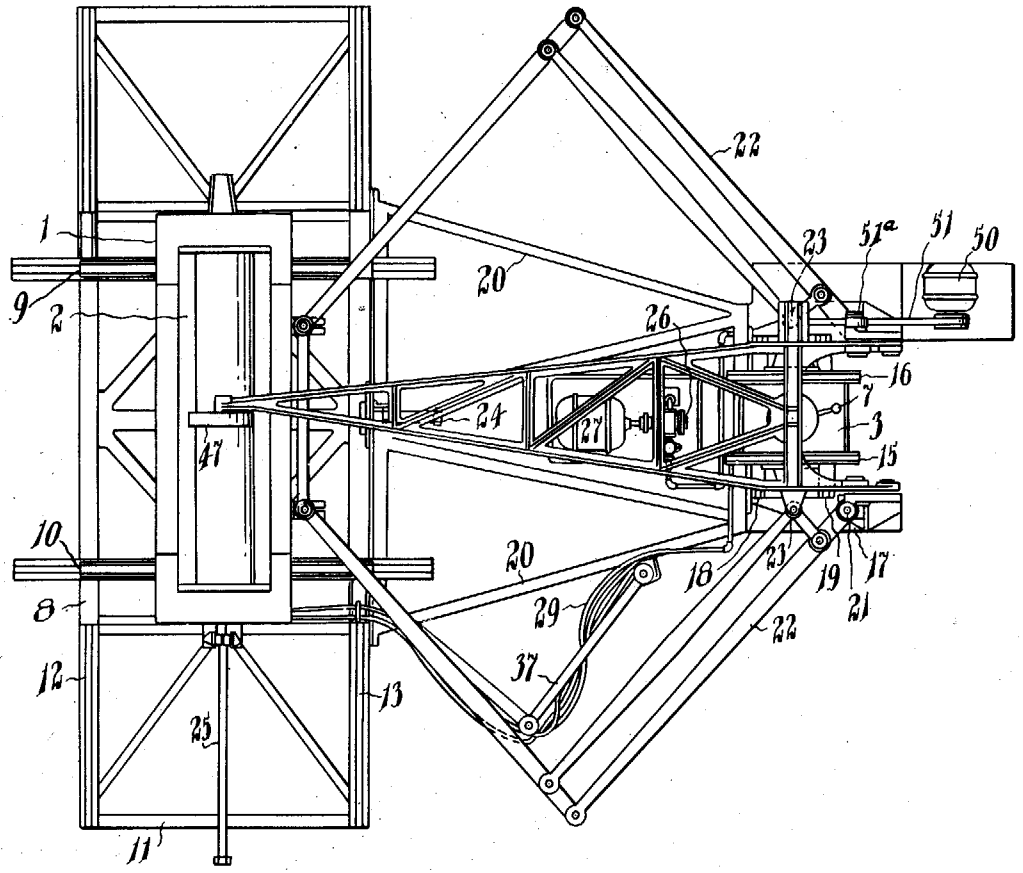
Fig. 2 is a plan view of the machine.

The pattern table 1 and the carriage 8 associated with the said table are driven by hydraulic power from the hydraulic jacks 24 and 25 respectively (see particularly Fig. 2). The jack 25 is mounted on the base 11 and its plunger is connected to the carriage 8; it gives a transverse motion to the said carriage. The jack 24 is mounted on the carriage 8 and its plunger is connected to the pattern table 1, and serves to reciprocate the pattern table on the carriage 8 upon which it is supported, longitudinally with respect to the frame of the machine. As hereinbefore mentioned, such movements of the pattern table both in a longitudinal and in a transverse direction are transmitted proportionally to the work table 3 by the pantograph arms 22.

Hydraulic power to the jacks is provided by a pump 26 driven by an electric motor 27.

The fluid under pressure is passed through the main control box 28 embodying various controls, and through the flexible hydraulic lines 29 to the jacks 24 and 25.

In the control box are provided three selector valves 30, 31 and 32 with operating levers protruding through the panel. Valve 30 enables the operator to raise and lower the work table 3, and is operated in conjunction with a restrictor valve 33 for fine adjustment. Valve 31 initiates the reciprocating stroke and the traverse or indexing of the carriage 8; in the up position it starts the reciprocating grinding stroke, whereas in the down position it effects rapid traverse of the carriage 8. Valve 32 is used to select right or left-hand indexing. All valves have neutral positions. Mounted above the selector valves are two flow control valves 34 and 35 which are connected to the reciprocating stroke lines (hydraulic jack 24) and to the traverse or indexing lines (hydraulic jack 25), respectively, and function to regulate the speed of the reciprocating strokes and the indexing of the carriage 8. A hydraulic pressure gauge 36 is also mounted in the control panel and connects to the pump 26. Electrical start and stop switches (not illustrated) are within easy reach of the operator.

The hydraulic lines 29 are carried by a hinged lazy-arm 37 to prevent drag and maintain generous bends in the said hydraulic lines.

Underneath the pattern table 1 is an adjustable cam 38 which is adapted to actuate a plunger 39 of the valve 40 mounted on the carriage 8. The actuation of the plunger 39 of the valve 40 by cam 38 admits a given amount of fluid to the jack 25, subject of course to the setting of the selector valve 31 and the flow control valve 35, thus regulating the rate of traverse or indexing of the carriage 8 carrying the pattern table 1 across the longitudinal centre line of the machine. Reciprocatory motion of the pattern table 1 relative to the carriage 8 is controlled by adjustable stops 41 and 42 mounted on the pattern table 1 each of which is adapted at the end of alternate strokes to trip the lever 43 of reversing valve 44 which in turn controls the operation of the hydraulic jack 24. An arrangement of by-pass lines and pressure relief valves serves to decelerate the pattern table 1 at the end of each stroke prior to reversal of its travel.

Extending from the base 17 are a pair of horizontally disposed trunnion bearings 45 (see Fig. 5) which furnish the fulcrum of a lever 46. The bearings 45 embody large thrust-radial ball bearings to reduce friction of vertical movement of the lever 46 while maintaining a high degree of lateral stability. The lever 46 is of rigid construction and carries at one end a tracer wheel 47 adapted to bear on the pattern 2 and also carries at a point between the fulcrum and the tracer wheel a rotatable grinding or cutting tool 48, in such a manner that when the tracer wheel is in contact with the pattern, the tool is in contact with the work piece 4, within the limits of vertical adjustment of the work piece above the work table 3 by means of the column 5. Furthermore, the relationship between the bearings 45, the tracer wheel 47 and the tool 48 is so arranged that the ratio between the vertical movement of the tracer wheel and the vertical movement of the tool is substantially the same as the ratio of horizontal movement of the pattern table 1 with respect to that of the work table 3, as prescribed by the pantograph mechanism.

Similarly, for correct reproduction, the diameter of the tracer wheel 47 and the diameter of the cutting tool 48 must be in like ratio to one another. The tracer wheel is interchangeable with others of different construction, diameter, width, and tread form, and the said wheel must be selected to suit the curvatures encountered in the pattern which is to be reproduced. The tool 48 must be selected accordingly to maintain the correct ratio of dimensions. For work where great accuracy is not essential, the rotary type of tool may be substituted by a tool bit.

The tracer wheel 47 is mounted on ball bearings to reduce friction. Dependent upon the curvatures of the work, it may be necessary at times to use a tool 48 of comparatively small diameter so that the bearing 48a (see Fig. 5) which supports the spindle of the said tool must also be of small external diameter to avoid fouling the work piece. For this reason the use of ball or needle bearings is impracticable, and a plain journal is used, the said journal being lubricated by air introduced under pressure through tube 49, since oil lubrication with the attendant risk of fouling the tool would be undesirable, especially during grinding operations. The tool is driven by an electric motor 50 through a belt 51 and a spindle 52. The belt is constrained by a pair of idler rollers 51a so that it always passes close to the axis of the trunnion bearings 45, and its tension is therefore unaffected by the rise and fall of the lever 46.

The lever 46 is balanced by means of spring struts 53 which are adjusted in such a manner that, without the tracer wheel 47 in place, the lever is in perfect balance. Thus the reaction between the tracer wheel 47 and the pattern 2 is equivalent to the weight of the tracer wheel 47 alone, and this small reaction will cause no substantial depression or distortion of the surface of the pattern. An air operated jack 54 serves to support the lever 46 when the tracer 47 is not in contact with the pattern 2.

To operate the machine a pattern 2, made of plaster or some other suitable material, is secured to the pattern table 1 and after an appropriate size of tracer wheel 47 has been selected and mounted on the lever 46 the said tracer wheel is lowered by means of the air jack 54 into contact with the surface of the pattern. The stops 41 and 42 regulating the stroke and the cam 38 regulating the speed of traverse are then set. Next a cutting or grinding tool 48 appropriate to the nature of the work and to the size of tracer wheel 47 is selected and mounted on the spindle 52. The work piece 4 is then secured to the platform 6 and rotated to the correct orientation and locked in position. The tool 48 and the hydraulic pump 26 are then set in motion and the controls on the panel of the control box 28 are set to the appropriate speeds. By means of the column 5 the work piece 4 is adjusted into contact with the tool 48 and locked in position by the handle 7 relative to the work table 3.

As the pattern table 1 carrying the pattern 2 reciprocates under the influence of the hydraulic jack 24, and the said pattern table supported by the carriage 8 traverses by small increments across the machine due to the operation of the hydraulic jack 25, the work piece follows a similar path to that of the pattern but reduced in scale in accordance with the ratio of the pantograph arms 22. The tracer wheel 47 rolls over the surface of the pattern following every contour under the influence of its own weight, and the tool 48 follows a similar path reduced in scale, in accordance with the ratio of the lever 46. Consequently, in three dimensions, the surface of the work piece 4 is cut or ground in a direct reproduction of the surface of the pattern 2, reduced in scale in accordance with the common ratio of the pantograph arms 22 and the lever 46. The process continues automatically until arrested by the operator or by preset electrical contacts placed on the pattern and actuated by the tracer wheel, to lift the lever 46 by the air jack 54 and at the same time to cut off the power supply to the machine.

Throughout the specification the directional terms "horizontal" and "vertical" are used for convenience and to facilitate the description and are not to be considered in a restrictive sense. Moreover, wherever the term "longitudinal movement" is used, it is intended to mean movement parallel to the longitudinal axis of the machine, which is taken as being a hypothetical line joining the tables 1 and 3 when they are at their midpositions.

It is thought that the construction and use of the invention will be apparent from the above description of the various parts and their purpose. It is to be understood that the form of the invention herewith shown and described, is to be taken as a preferred example of the same, and that various changes in the shape, size and arrangement of parts may be resorted to, without departing from the spirit of the invention or the scope of the subjoined claims.

What we claim is:

1. In a copying machine, a frame, a pattern table adapted to carry a model of the article to be copied, a mounting on the frame for said pattern table permitting [longitudinal and transverse] movement of said table [relative to the frame] *in any direction* in a horizontal plane, means for reciprocating the pattern table [longitudinally] *in one direction*, means for moving the pattern table [transversely] *in another direction*, a work table adapted to support a work piece, a mounting for said work table on the frame permitting movement of said table relative to the frame *in any direction* in a horizontal plane, a guiding mechanism including means connected between the pattern table and the frame for measuring the movement of the pattern table with respect to the frame and means connected between the work table and the frame for controlling the movement of the work table with respect to the frame, the said measuring means and work table movement controlling means being interengaged and the work table movement controlling means being controlled by the measuring means so that the movement of the work table is proportional to the movement of the pattern table, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

2. In a copying machine, a frame, a pattern table adapted to carry a model of the article to be copied, a mounting on the frame for said pattern table permitting [longitudinal and transverse] movement of said table [relative to the frame] *in any direction* in a horizontal plane, [means for reciprocating the pattern table longitudinally, means for moving the pattern table transversely,] a work table adapted to support a work piece, a mounting *on the frame* for said work table [on the frame] permitting movement of said *work* table relative to the frame *in any direction* in a horizontal plane, *means for reciprocating one of said pattern table and work table in one direction, means for moving the said one table in another direction*, a guiding mechanism including means connected between [the pattern table and] the frame *and the said one table* for measuring the movement of the [pattern] said one table with respect to the frame and means connected between [the work table and] the frame *and the other of said pattern table and work table* for controlling the movement of [the work] *said other* table with respect to the frame, the said measuring means and [work] table movement controlling means being interengaged and the [work] table movement controlling means being controlled by the measuring means so that the movement of the [work] *said other* table is proportional to the movement of the [pattern] *said one* table, a lever fulcrumed at one end on the frame for movement in a vertical plane, a tracer carried by the lever at its other end and adapted to engage the model, *and* a cutting tool carried by the lever intermediate the ends and adapted to engage the work piece, said lever serving to impart proportionally to the cutting tool vertical movement of the tracer.

3. In a copying machine, a frame, a pattern table adapted to carry a model of the article to be copied, a mounting on the frame for said pattern table permitting [longitudinal and transverse] movement of said table relative to the frame *in any direction* in a horizontal plane, means for reciprocating the pattern table [longitudinally] *in one direction,* means for moving the pattern table [transversely] *in another direction,* a work table adapted to support a work piece, a mounting for said work table on the frame permitting movement of said table relative to the frame in a horizontal plane, a mechanism linking the said pattern table and work table to impart to the work table a movement proportional to that of the pattern table, a lever fulcrumed at one end on the frame for movement in a vertical plane, a tracer carried by the lever at its other end and adapted to engage the model, and a cutting tool carried by the lever at a point intermediate the said ends, the ratio of the distance of said point from the fulcrum end of the lever with respect to the distance between the said fulcrum end and the tracer end being the same as the radtio of the horizontal movement of the work table with respect to the horizontal movement of the pattern table as prescribed by the linking mechanism.

4. In a copying machine, a frame, a pattern table adapted to carry a model of the article to be copied, a mounting on the frame for said pattern table permitting [longitudinal and transverse] movement of said table [relative to the frame] *in any direction* in a horizontal plane, [means for reciprocating the pattern table longitudinally, means for moving the pattern table transversely,] a work table adapted to support a work piece, a mounting *on the frame* for said work table [on the frame] permitting movement of said *work* table relative to the frame *in any direction* in a horizontal plane, *means for reciprocating one of said pattern table and work table in one direction, means for moving the said one table in another direction,* a guiding mechanism including means connected between [the pattern table and] the frame *and the said one table* for measuring the movement of the [pattern] *said one* table with respect to the frame and means connected between [the work table and] the frame *and the other of said pattern table and work table* for controlling the movement of [the work] said other table with respect to the frame, the said measuring means and [work] table movement controlling means being interengaged and the [work] table movement controlling means being controlled by the measuring means so that the movement of the [work] *said other* table is proportional to the movement of the [pattern] *said one* table, a lever having its fulcrum on the frame for movement in a vertical plane, a tracer carried by the lever and adapted to engage the model, a cutting tool also carried by the lever and adapted to engage the work piece, said lever serving to impart proportionally to the cutting tool vertical movement of the tracer, and means to balance the lever about its fulcrum when the tracer is removed from the lever so that in operation the effective weight bearing on the pattern is that of the tracer only.

5. In a copying machine, a frame, a pattern table carriage mounted for movement on the frame in a horizontal plane, a pattern table adapted to carry a model of the article to be copied and mounted on the carriage for movement in a horizontal plane in a direction transverse to the direction of movement of the carriage, means for reciprocating one of said carriage and pattern table [longitudinally with respect to the frame] *in one direction,* means for moving the other of said carriage and pattern table [transversely with respect to the frame] *in a direction transverse to the direction of reciprocation,* a work table carriage mounted for movement in a horizontal plane on the frame, the said work table carriage being spaced from the pattern table carriage, a work table adapted to support a work piece and mounted on the said work table carriage for movement in a horizontal plane in a direction transverse to the direction of movement of its carriage, a guiding mechanism including means connected between the pattern table and the frame for measuring the movement of the pattern table with respect to the frame and means connected between the work table and the frame for controlling the movement of the work table with respect to the frame, the said measuring means and work table movement controlling means being interengaged and the work table movement controlling means being controlled by the measuring means so that the movement of the work table on the work table carriage and of the work table carriage on the frame is proportional to the movement of the pattern table on the pattern table carriage and of the pattern table carriage on the frame, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

6. In a copying machine, a frame, a pattern table adapted to carry a model of the article to be copied, a mounting on the frame for said pattern table permitting longitudinal and transverse movement of said table relative to the frame in a horizontal plane, means for reciprocating the pattern table longitudinally, means for moving the pattern table transversely, a work table adapted to support a work piece, a mounting for said work table on the frame permitting movement of said table relative to the frame in a horizontal plane, a pantograph mechanism anchored pivotally to the frame and linking the said pattern table and work table so that any horizontal movement of one of them is reproduced proportionally by a horizontal movement of the other, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

7. In a copying machine, a frame, a pattern table carriage mounted for movement on the frame in a horizontal plane, a pattern table adapted to carry a model of the article to be copied and mounted on the carriage for movement in a horizontal plane in a direction transverse to the direction of movement of the carriage, means for reciprocating one of said carriage and pattern table [longitudinally with respect to the frame] *in one direction,* means for moving the other of said carriage and pattern table transversely with respect to [the frame] *the direction of reciprocation* including a prime mover connected to the other of said carriage and pattern table and a control for said prime mover responsive to the strokes of one of said carriage and pattern table for indexing the movement of the other of said carriage and pattern table, a work table carriage mounted for movement in a horizontal plane on the frame, the said work table carriage being spaced from the pattern table carriage, a work table adapted to support a work piece and mounted on the said work table carriage for movement in a horizontal plane in a direction transverse to the direction of movement of its carriage, a mechanism linking the pattern table and the work table to impart to the work table and its carriage a movement corresponding to that of the pattern table on its carriage and also a movement corresponding to that of the pattern table carriage on the frame, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

8. In a copying machine, a frame, a pattern table adapted to carry a model of the article to be copied and movable on the frame universally in a horizontal plane, a work table adapted to support a work piece and movable on the frame universally in a horizontal plane, a pantograph mechanism anchored pivotally to the frame and linking the said pattern table and work table so that any horizontal movement of one of said tables is reproduced proportionally by a horizontal movement of the other, a lever having its fulcrum on the frame and being constrained to move in a plane perpendicular to the plane of movement of the pantograph mechanism, a tracer carried by the lever and adapted to engage the model, and a cutting tool also carried by the lever and adapted to engage the work piece, the ratio between the movement of the tracer and the movement of the cutting tool as prescribed by the lever being equal to the ratio of the movement of the pattern and the movement of the work piece as prescribed by the pantograph mechanism.

9. In a copying machine, a frame, a pattern table carriage mounted for movement on the frame in a horizontal plane, a pattern table adapted to carry a model of the article to be copied and mounted on the carriage for movement in a horizontal plane in a direction transverse to the direction of movement of the carriage, means for reciprocating one of said carriage and pattern table [longitudinally with respect to the frame] *in one direction*, means for moving the other of said carriage and pattern table transversely with respect to the [frame] *direction of reciprocation*, a work table carriage mounted for movement in a horizontal plane on the frame, the said work table carriage being spaced from the pattern table carriage, a work table adapted to support a work piece and mounted on the said work table carriage for movement in a horizontal plane in a direction transverse to the direction of movement of its carriage, a mechanism linking the pattern table and the work table to impart to the work table and its carriage a movement corresponding to that of the pattern able on is carriage and also a movement corresponding to that of the pattern table carriage on the frame, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer, the mounting of a carriage on the frame including two pairs of parallel races with rotatable bearing members therebetween, one race of each pair being secured to the carriage and the other race to the frame, all of the said races being of V-section with the exception of one which is flat.

10. In a copying machine, a frame, a pattern table carriage mounted for movement on the frame in a horizontal plane, a pattern table adapted to carry a model of the article to be copied and mounted on the carriage for movement in a horzontal plane in a direction transverse to the direction of movement of the carriage, means for reciprocating one of said carriage and pattern table [longitudinally with respect to the frame] *in one direction*, means for moving the other of said carriage and pattern table transversely with respect to the [frame] *direction of reciprocation*, a work table carriage mounted for movement in a horizontal plane on the frame, the said work table carriage being spaced from the pattern table carriage, a work table adapted to support a work piece and mounted on the said work table carriage for movement in a horizontal plane in a direction transverse to the direction of movement of its carriage, a mechanism linking the pattern table and the work table to impart to the work table and its carriage a movement corresponding to that of the pattern table on its carriage and also a movement corresponding to that of the pattern table carriage on the frame, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer, the mounting of a table on its carriage including two pairs of parallel races with rotatable bearing members therebetween, one race of each pair being secured to the table and the other race to the carriage, all of the said races being of V-section with the exception of one which is flat.

11. In a copying machine, a frame, a pattern table carriage mounted for movement *on the frame in one direction* in a horizontal plane, [on the frame transversely of the longitudinal axis of the frame,] means for indexing the said carriage, a pattern table adapted to carry a model of the article to be copied and mounted on the carriage for movement in a horizontal plane in a [longitudinal direction with respect to the frame,] *direction transverse to the direction of movement of the pattern table carriage* means for reciprocating the pattern table, a work table carriage mounted for movement *on the frame* in a horizontal plane [on the frame transversely of the longitudinal axis of the frame,] *in the same direction as the direction of movement of the pattern table carriage*, the said work table carriage being spaced from the pattern table carriage, a work table adapted to support a work piece and mounted on the work table carriage for movement in a horizontal plane in a direction transverse to the direction of movement of its carriage, a pantograph mechanism anchored pivotally to the frame and linking the pattern table and the work table so that any horizontal movement of the pattern table is reproduced proportionally by a horizontal movement of the work table, a lever having its fulcrum on the frame and being constrained to move in a vertical plane, a tracer carried by the lever and adapted to engage the model, and a cutting tool also carried by the lever and adapted to engage the work piece, the ratio between the movement of the tracer and the movement of the cutting tool as prescribed by the lever being equal to the ratio of the movement of the pattern table and the movement of the work table as prescribed by the pantograph mechanism.

12. In a copying machine, a frame, a pattern table carriage mounted for movement *on the frame in one direction* in a horizontal plane, [on the frame transversely of the longitudinal axis of the frame,] means for indexing the said carriage, a pattern table adapted to carry a model of the article to be copied and mounted on the carriage for movement in a horizontal plane in a [longitudinal direction with respect to the frame,] *direction transverse to the direction of movement of the pattern table carriage,* means for reciprocating the pattern table, the indexing means including a prime mover connected to the carriage, and a control for said prime mover responsive to the strokes of the reciprocating pattern table, a work table carriage mounted for movement *on the frame* in a horizontal plane [on the frame transversely of the longitudinal axis of the frame,] *in the same direction as the direction of movement of the pattern table carriage,* the said work table carriage being spaced from the pattern table carriage, a work table adapted to support a work piece and mounted on the work table carriage for movement in a horizontal plane in a direction transverse to the direction of movement of its carriage, a pantograph mechanism anchored pivotally to the frame and linking the pattern table and the work table so that any horizontal movement of the pattern table is reproduced proportionally by a horizontal movement of the work table, a lever having its fulcrum on the frame and being constrained to move in a vertical plane, a tracer carried by the lever and adapted to engage the model, and a cutting tool also carried by the lever and adapted to engage the work piece, the ratio between the movement of the tracer and the movement of the cutting tool as prescribed by the lever being equal to the ratio of the movement of the pattern table and the movement of the work table as prescribed by the pantograph mechanism.

13. In a copying machine, a frame, a pattern table carriage mounted for movement *on the frame in one direction* in a horizontal plane, [on the frame transversely of the longitudinal axis of the frame,] means for indexing the said carriage, a pattern table adapted to carry a model of the article to be copied and mounted on the carriage for movement in a horizontal plane in a [longitudinal direction with respect to the frame,] *direction transverse to the direction of movement of the pattern table carriage,* means for reciprocating the pattern table, the reciprocating means including a prime mover connected to the pattern table and adapted to move it in two senses, sense reversing means for said prime mover adapted to be actuated by the pattern table at the end of a stroke in one sense to cause the prime mover to urge the pattern table in the opposite sense, a work table carriage mounted for movement *on the frame* in a horizontal plane [on the frame transversely of the longitudinal axis of the frame,] *in the same direction as the direction of movement of the pattern table carriage,* the said work table carriage being spaced from the pattern table carriage, a work table adapted to support a work piece and mounted on the work table carriage for movement in a horizontal plane in a direction transverse to the direction of movement of its carriage, a pantograph mechanism anchored pivotally to the frame and linking the pattern table and the work table so that any horizontal movement of the pattern table is reproduced proportionally by a horizontal movement of the work table, a lever having its fulcrum on the frame and being constrained to move in a vertical plane, a tracer carried by the lever and adapted to engage the model, and a cutting tool also carried by the lever and adapted to engage the work piece, the ratio between the movement of the tracer and the movement of the cutting tool as prescribed by the lever being equal to the ratio of the movement of the pattern table and the movement of the work table as prescribed by the pantograph mechanism.

14. In a copying machine, a frame, a pattern table adapted to carry a model of the article to be copied and movable on the frame universally in a horizontal plane, a work table adapted to support a work piece and movable on the frame universally in a horizontal plane, a pantograph mechanism having one arm pivotally mounted to the frame another arm pivotally mounted to the pattern table and a third arm pivotally mounted to the work table, the pivotal connection between one of the tables and an arm being axially free so that the pantograph mechanism carries no vertical load, the said pantograph mechanism being adapted to reproduce proportionally in one of the tables any horizontal movement of the other table, a lever having its fulcrum on the frame and being constrained to move in a plane perpendicular to the plane of movement of the pantograph mechanism, a tracer carried by the lever and adapted to engage the model, and a cutting tool also carried by the lever and adapted to engage the work piece, the ratio between the movement of the tracer and the movement of the cutting tool as prescribed by the lever being equal to the ratio of the movement of the pattern table and the movement of the work table as prescribed by the pantograph mechanism.

15. In a copying machine, a frame, a pattern table adapted to carry a model of the article to be copied, a mounting on the frame for said pattern table permitting [longitudinal and transverse] movement of the said table relative to the frame *in any direction* in a horizontal plane, [means for reciprocating the pattern table longitudinally, means for moving the pattern table transversely,] a work table, a vertically adjustable column extending from said work table and adapted to support a work piece, means to lock the column against movement, a mounting for said work table on the frame permitting movement of said table relative to the frame *in any direction* in a horizontal plane, *means for reciprocating one of said tables in one direction, means for moving said one table in another direction,* a mechanism linking the said pattern table and work table to impart to the work table a movement corresponding to that of the pattern table, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

16. In a copying machine, a frame, a pattern table adapted to carry a model of the article to be copied, a mounting on the frame for said pattern table permitting [longitudinal and transverse] movement of the said table relative to the frame *in any direction* in a horizontal plane, [means for reciprocating the pattern table longitudinally, means for moving the pattern table transversely,] a work table, a rotatable horizontal platform mounted on the work table and adapted to support a work piece, means to lock the platform against movement, a mounting for said work table on the frame permitting movement of said work table relative to the frame *in any direction* in a horizontal plane, *means for reciprocating one of said tables in one direction, means for moving said one table in another direction,* a mechanism linking the said pattern table and work table to impart to the work table a movement corresponding to that of the pattern table, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

17. In a copying machine, a frame, a pattern table adapted to carry a model of the article to be copied, a mounting on the frame for said pattern table permitting [longitudinal and transverse] movement of the said table relative to the frame *in any direction* in a horizontal plane, [means for reciprocating the pattern table longitudinally, means for moving the pattern table transversely,] a work table, a vertically adjustable column extending from said work table, a rotatable horizontal platform mounted on the column and adapted to support a work piece, means to adjust the elevation of the column, means to lock the column and platform in a selected position of orientation and vertical height, a work table adapted to support a work piece, a mounting for said work table on the frame permitting movement of said work table relative to the frame, *in any direction* in a horizontal plane, *means for reciprocating one of said tables in one direction, means for moving said one table in another direction,* a mechanism linking the said pattern table and work table to impart to the work table a movement corresponding to that of the pattern table, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.

*18 In a copying machine, a frame, a pattern table adapted to carry a model of the article to be copied, a mounting on the frame for said table permitting movement of said table in any direction in a horizontal plane, a work table adapted to support a work piece, a mounting on the frame for said work table permitting movement of said work table relative to the frame in any direction in a horizontal plane, means for reciprocating one of said pattern table and work table in one direction, means for moving the said one table in another direction, a guiding mechanism including means connected between the frame and the said one table for measuring the movement of the said one table with respect to the frame and means connected between the frame and the other of said pattern table and work table for controlling the movement of said other table with respect to the frame, the said measuring means and table movement controlling means being interengaged and the table movement controlling means being controlled by the measuring means so that the movement of the said other table is proportional to the movement of the said one table, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.*

*19. In a copying machine, a frame, a pattern table adapted to carry a model of the article to be copied, a mounting on the frame for said pattern table permitting movement of said table relative to the frame in any direction in a horizontal plane, a work table adapted to support a work piece, a mounting for said work table on the frame permitting movement of said table relative to the frame in any direction in a horizontal plane, means for reciprocating one of said tables in one direction, means for moving said one table in another direction, a pantograph mechanism anchored pivotally to the frame and linking the said pattern table and work table so that any horizontal movement of one of them is reproduced proportionally by a horizontal movement of the other, a lever having its fulcrum on the frame for movement in a vertical plane, a tracer carried by the lever and adapted to engage the model, and a cutting tool also carried by the lever and adapted to engage the work piece, said lever serving to impart proportionally to the cutting tool vertical movement of the tracer.*

LAWRENCE EDGAR MARCHANT.
VICTOR WILSON HALL.
JOHN OLIVER CREEK.

REFERENCES CITED

The following references are of record in the file of this patent or the original patent:

UNITED STATES PATENTS

| Number | Name | Date |
|---|---|---|
| 1,758,534 | Porter | May 13, 1930 |
| 2,394,671 | Duncan | Feb. 12, 1946 |

FOREIGN PATENTS

| Number | Country | Date |
|---|---|---|
| 370,205 | Germany | Feb. 28, 1923 |
| 463,767 | Great Britain | Apr. 6, 1937 |